United States Patent [19]

Yoshida et al.

[11] 4,328,506
[45] May 4, 1982

[54] OPTICAL RECORDING DEVICE

[75] Inventors: Tomio Yoshida, Katano; Michiyoshi Nagashima, Ikoma; Shunji Harigae, Neyagawa; Makoto Ichinose, Moriguchi; Noboru Wakami, Osaka, all of Japan

[73] Assignee: Matsushita Electric Industrial Co., Ltd., Osaka, Japan

[21] Appl. No.: 216,974

[22] Filed: Dec. 16, 1980

[30] Foreign Application Priority Data

Dec. 18, 1979 [JP] Japan ................... 54/165359

[51] Int. Cl.³ .................... G01D 15/14; G11B 7/00
[52] U.S. Cl. .................... 346/108; 346/76 L; 369/116; 358/128.5
[58] Field of Search ............ 346/76 L, 108; 358/128.5, 128.6; 369/116, 111

[56] References Cited

U.S. PATENT DOCUMENTS 4,118,734 10/1978 Bouwhuis et al. ......... 346/76 L X
4,142,210 2/1979 Otobe et al. ............. 346/76 L X
4,190,860 2/1980 Somers et al. ........... 346/76 L X

*Primary Examiner*—L. T. Hix
*Assistant Examiner*—W. J. Brady
*Attorney, Agent, or Firm*—Burgess, Ryan & Wayne

[57] ABSTRACT

In an optical recording device in which the writing laser light beam is focused to a small spot on a disk which is coated with a photosensitive medium and spins at a predetermined velocity so that the data are recorded in terms of variable density or surface irregularities, the forward DC current applied to a semiconductor laser is varied depending upon the radius position of the writing laser beam spot on the disk but the AC current which is superposed on the DC current and rises or drops above or below the DC current level by a predetermined amplitude depending upon the data to be recorded is maintained constant regardless of the radius position of the writing laser beam spot, whereby the duty ratio can be maintained constant regardless of the distance from the center of the disk of a selected recording track.

3 Claims, 9 Drawing Figures

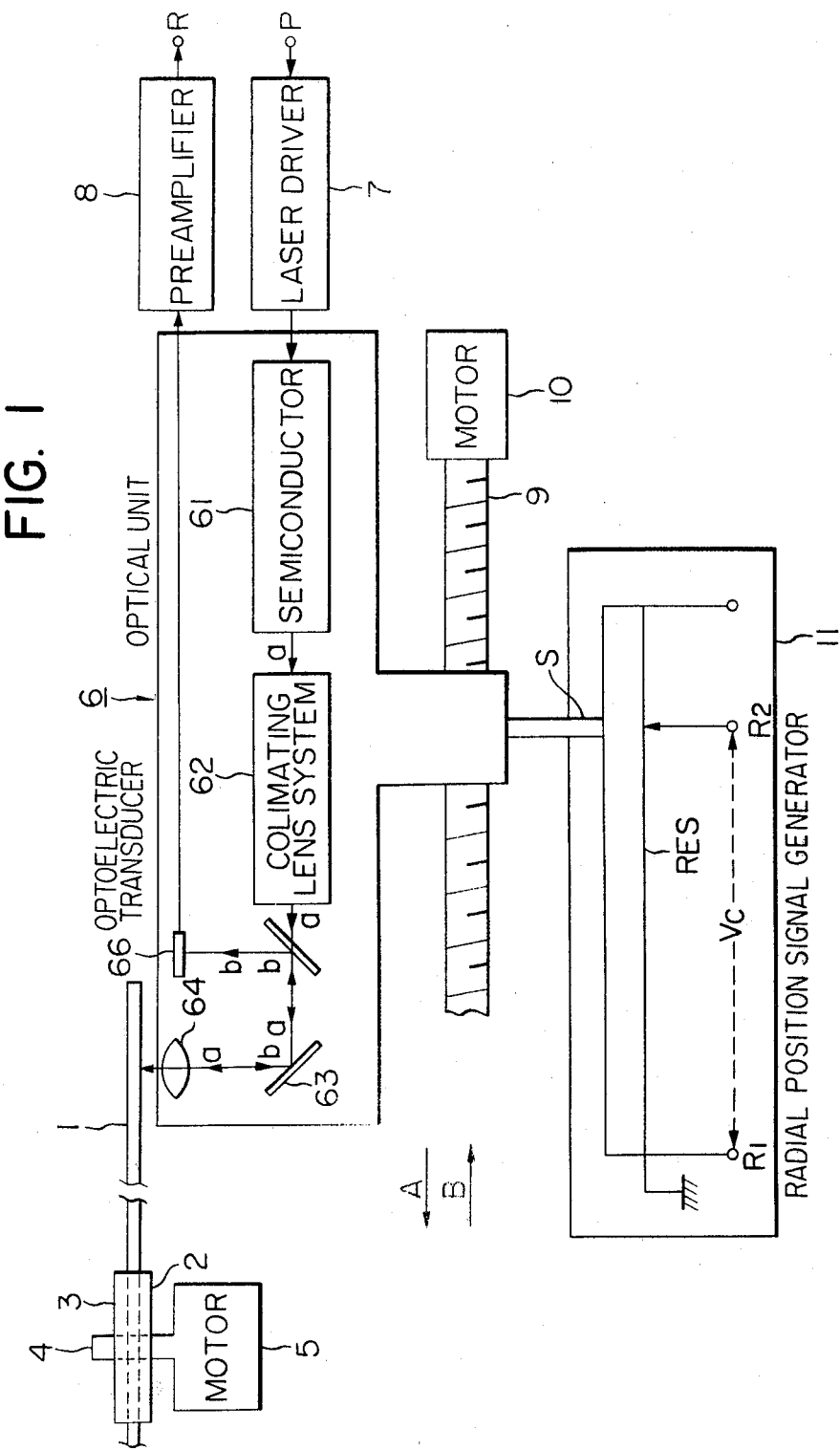

OPTICAL RECORDING DEVICE

BACKGROUND OF THE INVENTION

The present invention relates to an optical recording device.

There has been invented and demonstrated an optical recording system in which the writing laser beam is focused to a very small spot less than one micrometer in diameter on a disk made of or coated with a photosensitive medium and spinned at a predetermined velocity so that the data can be recorded at a higher degree of density in terms of variable density or surface irregularities.

Various optical disk systems have been well known which can reproduce the data or signals optically recorded at a higher degree of density in a manner as described above. In the production of the prerecorded optical disks, the above described optical recording system has been used. The recorded data are video, audio and digital signals.

According to the above-described optical recording system, the writing laser beam is focused on the recording thin film coated over the disk so that the laser beam melts and evaporates a small area on the disk, leaving a hole or pit or changing the reflection coefficient. To put in another way, the thermal energy of the writing laser beam causes the variation of the optical properties of a recording medium.

SUMMARY OF THE INVENTION

One of the objects of the present invention is to provide a novel optical recording device which can ensure high-quality recording results over the whole surface of a disk or which can result in high-quality pits or holes.

When a disk is spinning at a predetermined velocity, the peripheral velocity of a given track varies depending upon the distance from the center of the disk. For instance, the peripheral velocity is highest along the outermost track and is lowest along the innermost track. As a result, the recording energy of the writing laser beam must be higher along the outermost track than along the innermost track. If the recording energy remains unchanged both along the outermost and innermost tracks, the deformations of pits or holes and of the disk itself in the worst case along the innermost track would result so that high-quality recording results would not be attained. On the other hand, if the writing laser beam with an optimum recording energy level for the innermost track is used for recording along the outermost track, no pit or hole would be left at all.

Another problem encountered in the prior art optical recording system of the type described above is that the duty ratio of the signal being recorded is deviated from that of the pit or hole pattern left on the disk. More specifically, when the writing laser beam is modulated at the duty ratio of 50%, the trackwise length of each pit or hole is different from that of the unrecorded portion between the adjacent pits or holes. One of the reasons is that the energy of the writing laser beam focused on the disk is lost in the form of thermal conduction to the base of the disk. Another reason is that a recording threshold level; that is, the energy level of the writing laser beam at which a pit or hole is made in the disk is different from one disk to another depending upon the photosensitive media used. In the case of the recording and reproduction of the video or digital signals, the difference in duty ratio between the signal to be recorded and the pit or hole pattern left on the disk means that the faithful transmission of the waveform of the signal being recorded cannot be accomplished. In other words, high-quality reproduction or readout cannot be attained.

Another object of the present invention is, therefore, to provide a novel optical recording device which can ensure uniform high-quality recording results over the whole surface of a disk from the outermost track to the innermost track by controlling the recording energy.

A still another object of the present invention is to provide a novel optical recording device which can ensure that the duty ratio of the signal being recorded can be as exactly as that of the corresponding pit or hole pattern recorded on a disk.

The above and other objects, effects, features and advantages of the present invention will become more apparent from the following description of one preferred embodiment thereof taken in conjunction with the accompanying drawings.

BRIEF DESCRIPTION OF THE DRAWINGS

FIG. 1 is a schematic diagram of an optical recording and reproducing device in accordance with the present invention;

DESCRIPTION OF THE PREFERRED EMBODIMENT

Figure 2A:
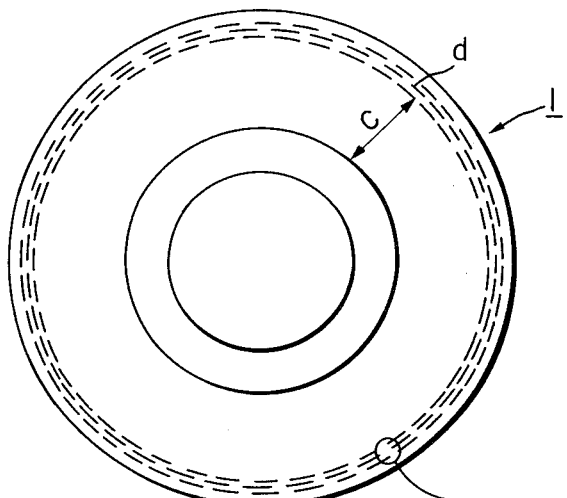
FIG. 2A shows the pit or hole patterns recorded on a disk.

Referring first to FIG. 1, a disk 1, which is made of a photosensitive compound, spins about a spindle 4 of a motor 5 at a predetermined velocity of, for instance, 1800 rpm for recording the NTSC video signal for one frame for each one rotation. The disk 1 is placed on a turntable 2 and pressed against it by a pad 3. An optical unit or an optical head 6 includes a light source such as a semiconductor laser 61 which emits the light beam a. The light beam a passes through a colimating lens system 62 and a beam splitter 65 and is reflected by a conventional tracking mirror to a focusing lens such as an objective 64 which is so controlled by a conventional voice coil or the like as to focus the laser light beam a to a small spot on the disk 1. The reflected laser light beam b is reflected by the beam splitter 65 to a high-speed optoelectric transducer 66 such as a PIN diode so that not only the recorded signal but also the focusing error and tracking error signals can be detected.

The terminal P of a laser driver 7 receives the signals to be recorded (for instance, the FM video signals) or the signal which determines the output power of the laser 61 in the case of the playback mode.

The output from the optoelectric transducer 66 is applied to a playback pre-amplifier 8 and the reproduced signal is derived from the terminal R thereof.

The optical unit 6 is shifted in either direction A or B by means of a lead-screw drive consisting of a lead screw 9 and a motor 10.

The signal representative of the radial position of the light beam a focused on the disk 1 is generated by a radial position signal generator 11 consisting of a resistor RES and a slider S extended from the optical unit 6 so that as the latter moves in the direction A or B the slider S slides over the resistor RES in the same direction. A voltage between the terminal $R_1$ at one end of the resistor RES and the terminal $R_2$ of the slider S represents the radial position of the light beam focused on the disk 1 and is used for controlling the level of the recording energy as will be described in detail below.

Figure 2B:
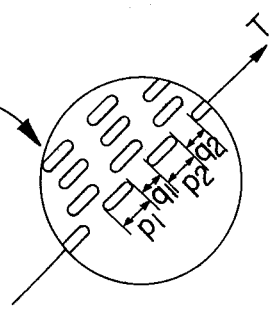
FIG. 2B shows them on an enlarged scale.

FIG. 2A shows the disk 1 with a recorded portion d and a non-recorded portion c. FIG. 2B shows on enlarged scale a part of the recorded portion and the recording is made in the direction T. When the intense writing light beam is focused to a small spot on the disk 1, it melts and/or vaporizes a small area on the disk, thus leaving pits or holes $p_1$, $p_2$ and so on. Alternatively, the focused light beam changes the optical properties at these pits or holes. The ratio in length in the track direction T between the pit p the non-recorded portion q between the adjacent pits or holes $p_1$ and $p_2$ is preferably equal to the duty ratio of the electric signal applied to the input terminal P of the laser driver 7 so that the waveshape of the signal can be faithfully recorded and reproduced. However, in practice, the ratio in length between p and q varies depending upon thermal diffusion in the disk 1, a threshold recording energy level (that is, a minimum level of recording energy enabling the signal to be recorded on the disk 1) and the recording energy produced. For instance, when the recording energy is not sufficient, the length of the pit or hole p is shorter than that over which the light beam has actually scanned. On the other hand when the recording energy is too intense, the length of the pit or hole p becomes longer. In addition, too intense recording energy would destroy too much the interior and rim of the pit or hole p, so that the qualities of the reproduced signal would be adversely affected.

In the reading mode, a continuous reading light beam (with such an intensity that information in storage will not be altered) is produced to scan a selected track and the reflected light is directed to the optoelectric transducer 66 as described elsewhere.

Figure 3:
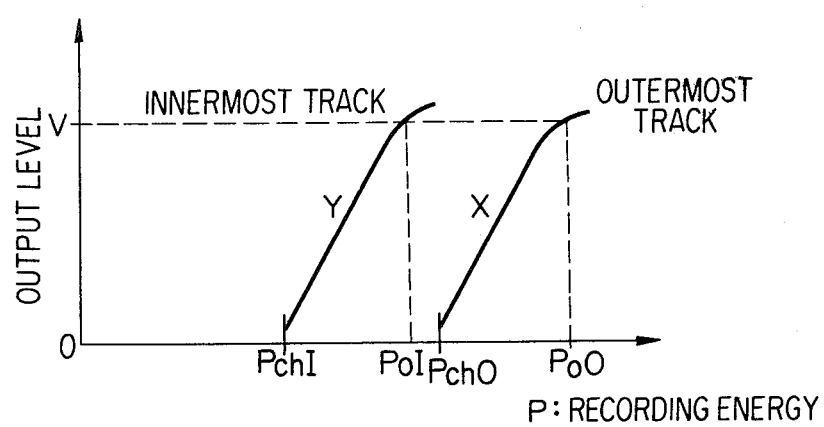
FIG. 3 shows the relation between the recording energy and the output level of a disk used in the present invention.

FIG. 3 shows the relationship between the recording energy (plotted along the abscissa) and the level of the readout signal (plotted along the ordinate). The curve X shows the characteristic when the signal is recorded along the outermost track while the curve Y shows the characteristic when the signal is recorded along the innermost track. When the recording energy is increased from zero and exceeds a threshold value $P_{thO}$ or $P_{thI}$, the recording is started; that is, the pits or holes p are made. With the recording energy $P_{oO}$ or $P_{oI}$ the amplitude of the reproduced signal becomes highest. The curves X and Y show that high-quality results can be obtained. In the case of the recording along the innermost track, the peripheral speed becomes slowest so that the recording energy must be lowered as shown.

Figure 4:
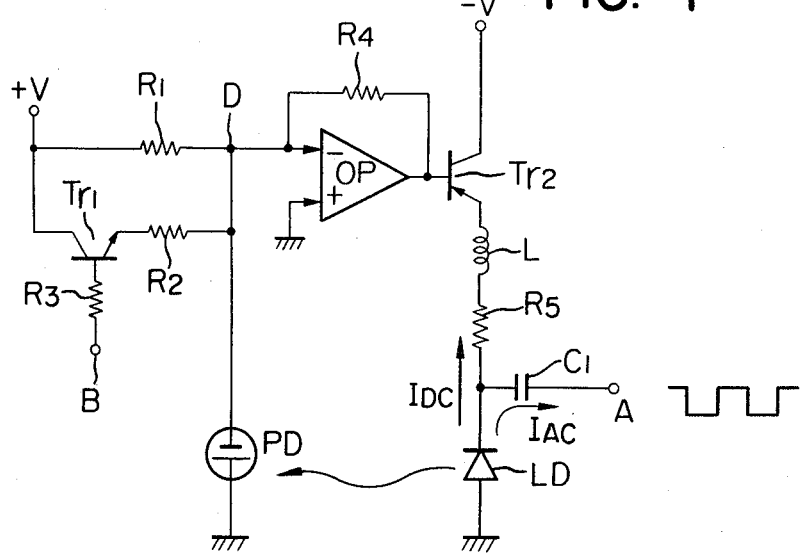
FIG. 4 is a diagram of a semiconductor laser drive circuit.

Next, referring to FIG. 4, the laser driver 7 will be described in detail. A DC bias current $I_{DC}$ flows from ground through a semiconductor laser LD, a resistor $R_5$, an inductance L and a transistor $Tr_2$ to a negative power supply $-V$. An optoelectric transducer PD such as a solar battery, an operational amplifier OP and the transistor $Tr_2$ constitute a servo loop which, in response to the laser light emitted from the diode laser LD and detected by the photodiode PD and the current flowing to the reference point D, maintains the output of the laser LD at a predetermined level regardless of the temperature of the laser LD. The current flowing into the reference point D is varied in response to the signal applied to the terminal B by a transistor $Tr_1$ and resistors $R_2$ and $R_3$. More specifically, the terminal $R_2$ of the variable resistor or the radial position signal generator 11 (See FIG. 1) is connected to the terminal B so that the output of the laser LD is varied depending upon the radial position of the laser beam spot on the disk 1. In response to the signal to be recorded which is applied at the terminal A, the modulated current $I_{AC}$ flows through a capacitor so that the laser light is modulated with the signal to be recorded. The above-described servo loop is so designed and constructed that it will not be able to follow the laser beam modulation with the signal at higher frequencies.

Figure 5:
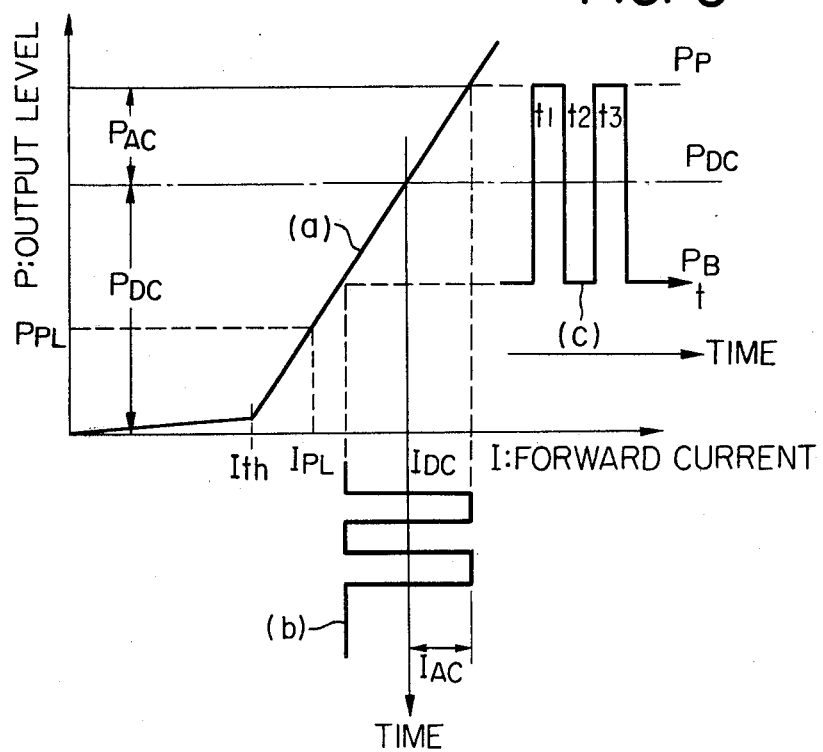
FIG. 5 is a view used for the explanation of the control of the output of a semiconductor laser or a diode laser used in the present invention.

The output characteristic of a semiconductor laser is shown by the curve (a) in FIG. 5. The forward current I is plotted along the abscissa while the output P, along the ordinate. When the forward current I exceeds a threshold value $I_{th}$, the laser emits the light beam the power of which is almost in proportion to the applied forward current. The modulated current $I_{AC}$ is shown at (b) in FIG. 5 and fluctuates above and below the current $I_{DC}$ by $I_{AC}$. The output of the laser is shown at (c) in FIG. 5 and is modulated in the range of $P_{DC} \pm P_{AC}$, where $P_{DC}$ is the output power in response to the forward current $I_{DC}$ and $P_{AC}$ is the output power in response to the modulated current $I_{AC}$.

With the optical recording and reproducing device of the type shown in FIG. 1, the laser beam is modulated as shown at (c) in FIG. 5 and is focused to a small spot on the disk 1 so that the pits or holes $p_1$ and $p_2$ (See FIG. 2B) are made during the time intervals $t_1$ and $t_3$, respectively, and during the time interval $t_2$ no recording is made as shown at $q_1$ in FIG. 2B.

In the case of the readout of the data stored on the disk, the forward current $I_{PL}$ is applied to the laser so that the continuous laser beam with the power $P_{PL}$ scans the disk.

Next, referring to FIG. 6, the relationship between the power-modulated writing laser beam and the trackwise length of the pit or hole p will be described in detail below. As shown at (I), the pits or holes p are plotted along the abscissa, and the time-based waveforms of the recording energy required to make such pits are shown at (II).

Figure 6A:
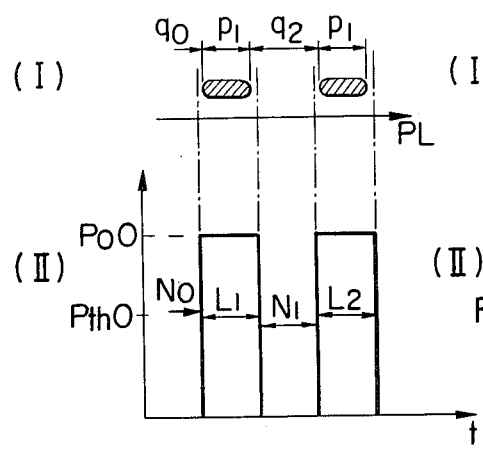
FIG. 6 is a view used for the explanation of the relationship between the recording energy or power and the pits or holes left on a disk.

When, in the case of the recording along the outermost track, the writing laser beam is focused with an optimum power (See $P_{oO}$ in FIG. 3) during the writing or recording time intervals $L_1$ and $L_2$ and almost no laser light beam is focused during the non-recording time interval $N_1$ as shown in FIG. 6A, the trackwise length of each of the pits or holes $P_1$ and $P_2$ becomes shorter the corresponding recording time interval $L_1$ or $L_2$. The reasons are as follows. First of all, at the leading edge of the pit or hole $P_1$ (that is, at the trailing edge of the unrecorded portion $q_o$) the sudden sharp rise of the recording energy (that is, the laser light beam power) results in thermal diffusion in the disk so that it takes some time before the recording energy reaches a threshold level $P_{th}$. At the trailing edge of the pit or hole $P_1$ the sudden sharp drop in the recording energy results in a corresponding sharp fall of the temperature gradient so that the trailing edge is not sharply defined. In the case of the readout of the pits or holes p shown at (I) in FIG. 6A, the duty ratio of the reproduced signal is considerably different from that of the recorded signal shown at (II) in FIG. 6A, so that the high-quality results cannot be obtained.

Figure 6B:
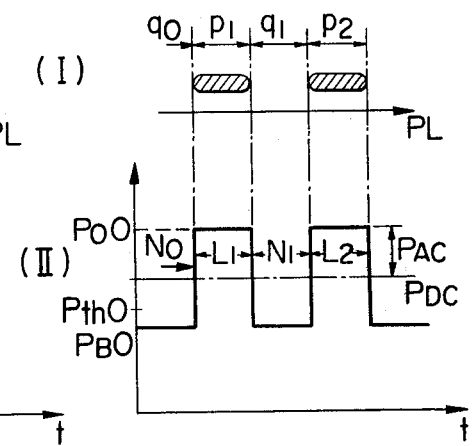
Figure 6C:
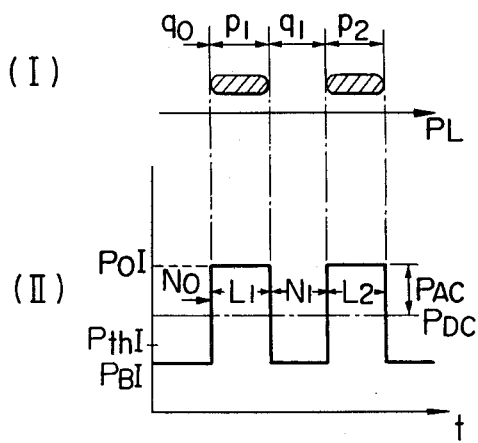

In order to overcome this problem, according to the present invention the recording energy or power P as shown at (II) in FIG. 6B or FIG. 6C is applied depending upon the distance of the track from the center of the disk. For instance, FIGS. 6B and 6C show the recording along the outermost and innermost tracks, respectively. As shown at (II) in FIG. 6B even when no recording or pit is made during the time intervals $N_o$ and $N_1$; that is, even when the laser light beam spot scans the unrecorded portions $q_o$ and $q_1$, the recording energy is maintained at such a certain level $P_{BO}$ above the zero level but below a threshold level $P_{thO}$ that no pit or hole may be made but the disk may be preheated during the time intervals $N_o$ and $N_1$. As a result, the thermal response of the disk; that is, the formation of the pits or holes p can be accelerated during the recording intervals $L_1$ and $L_2$. Thus, the trackwise lengths in terms of time of the pits or holes $p_1$ and $p_2$ can be made exactly equal to the recording time intervals $L_1$ and $L_2$, respectively, and the problem encountered in the prior art optical recording method and described with reference to FIG. 6A can be overcomed. Even when the trackwise length of the pit or hole p is almost equal to the diameter of the recording laser beam spot, an optimum recording energy or power level $P_{oO}$ can be lowered; that is, the output of the writing laser can be lowered.

In the case of the recording along the innermost track, the level of the recording energy or power is selected in a manner substantially similar to that described with reference to FIG. 6B and based on the characteristic curve Y shown in FIG. 3.

Next, the method of controlling the recording energy or power depending upon the distance from the center of the disk of a given track will be described in more detail below. As described elsewhere, the disk is spinning at a predetermined velocity, so that the recording energy must be varied depending upon the distance from the center of the disk of a given track. For instance, as shown in FIGS. 6B and 6C, the peak level $P_{oO}$ or $P_{oI}$ of the recording energy or power must be varied depending upon whether the signal is being recorded along the outermost or innermost track. To this end, the level of the DC component $P_{DC}$ of the recording energy or power (See FIGS. 5, 6B and 6C) is varied depending upon the distance from the center of the disk of a given track while the AC component $P_{AC}$ is kept unchanged. This scheme is advantageous in (1) that the difference between the preheating level $P_{BO}$ or $P_{BI}$ and the threshold level $P_{thO}$ or $P_{thI}$ can be maintained constant and (2) that the peak level $P_{oO}$ and $P_{oI}$ can be optimumly selected depending upon the distance from the center of the disk of a given track. In addition, this scheme can be realized in a simple manner in practice as will be described below.

Referring back to FIG. 4, the signal to be recorded is applied to the terminal A and the constant AC current $I_{AC}$ is delivered to the semiconductor laser LD independently of the distance from the center of a disk of a selected track. The DC current $I_{DC}$ delivered to the semiconductor laser LD is controlled depending upon the current flowing to the point D; that is, the potential applied to the terminal B from the variable resistor or radius position signal generator 11 shown in FIG. 1. Thus, the optimum control on the recording and pre-heating levels of the recording energy or power can be accomplished as described with reference to FIG. 5.

Referring back to FIG. 1, the means for generating the signal representative of the radius position of the laser beam spot has been so far described as consisting of a variable resistor, but it is to be understood that instead a linear encoder which is used as a range finder or a means capable of generating the radius position signal in response to the variation in inductance can be employed.

It is also to be understood that the signal from the variable resistor 11 is needed not be varied linearly from the outermost track to the innermost track. For instance, it is possible to provide a system which, as the optical unit 6 shifts from the outermost track to the innermost track of the disk, generates the signal whose level changes in a number of n steps (where n is an integer).

Instead of the above-described system for detecting the radius position of the laser beam spot, another system may be employed in which the recording energy is varied depending upon the light reflected back from a recorded signal or mark on the disk so as to represent a radius position. For instance, the disk may be provided with a plurality of optically recorded guide tracks each bearing a specific address. (For instance, the address number is incremented or decremented from the outermost track to the innermost track.) Then the optical unit 6 can scan the guide tracks on the disk 1 and make access to a desired recording track for recording. When the guide tracks are concentric, the recording can be started immediately after a selected address of the guide track has been read out. The readout digital address number can be delivered from the pre-amplifier 8 and converted into the analog signal which represents the radius position of the laser beam spot on the disk 1 and is applied to the terminal B shown in FIG. 4 so that the recording and pre-heating levels of the recording energy or power can be controlled depending upon the distance from the center of the disk of the selected track as described in detail hereinbefore.

In the digital-to-analog conversion of the readout address number, it is not needed to convert all the digits. For instance, the analog signal which varies in 100 steps depending upon the distance from the center of the disk can be obtained only by converting the three higher significant digits. Thus, the recording energy level can be varied also in 100 steps so that the objects of the present invention can be attained.

In summary, according to the present invention, the duty ratio of the recorded signal can be correctly made equal to that of the reproduced signal. In addition, the high-quality recording and reproduction results can be attained from the outermost track to the innermost track by the optical recording and reproducing device of the present invention.

What is claimed is:

1. An optical recording device in which the recording current whose AC component varies in the range between $\pm I_{AC}$ is applied to a light source which emits the output light in response to a current applied thereto, and the output light is focused to a small spot on a disk-shaped recording medium spinning at a predetermined velocity so that the recording is made along a concentric or spiral track in terms of the energy of the output light focused on said disk, Characterized by the provision of a radius position detecting means for generating the signal representative of the radius position of said output signal focused on the disk-shaped recording medium, and a DC component application means for applying the DC component $I_{DC}$, which varies in response to the output from said radius position detecting means, to said light source.

2. An optical recording device as set forth in claim 1 further characterized in that a guide track is provided on said disk-shaped recording medium along each recording track and bears an address signal representative of the radius position on said disk-shaped recording medium, and said address number on said guide track is read out in the readout and used for detecting the radius position of the output light focused on said disk-shaped recording medium.

3. An optical recording device as set forth in claim 1 further characterized in that said output light is focused in such a way that during each recording time interval during which a pit or hole is made, the current ($I_{DC}+I_{AC}$), where $I_{DC}$ is the DC component and $I_{AC}$ is the AC component, is applied to said light source so that said output light can have the recording energy or power level higher than a threshold recording level of the disk-shaped recording medium, but during each non-recording time interval during which no pit or hole is made, the current ($I_{DC}-I_{AC}$) is applied to said light source so that the output light can have a recording energy or power level which is below said threshold recording level but is as near to said threshold recording level as possible.

* * * * *